United States Patent [19]

Miller et al.

[11] Patent Number: 4,891,152
[45] Date of Patent: Jan. 2, 1990

[54] DISPERSION OF LIQUID CRYSTAL DROPLETS IN A PHOTOPOLYMERIZED MATRIX AND DEVICES MADE THEREFROM

[75] Inventors: Leroy J. Miller, Canoga Park; Camille van Ast; Frederick G. Yamagishi, both of Newbury Park, all of Calif.

[73] Assignee: Hughes Aircraft Company, Los Angeles, Calif.

[21] Appl. No.: 138,413

[22] Filed: Dec. 28, 1987

[51] Int. Cl.$^4$ ............................................. C09K 19/52
[52] U.S. Cl. .......................... 252/299.01; 252/299.5; 252/299.66; 350/350 R; 428/1
[58] Field of Search .................... 350/350 R; 428/1; 252/299.01, 299.5, 299.66

[56] References Cited

U.S. PATENT DOCUMENTS

| | | | |
|---|---|---|---|
| 3,620,889 | 11/1971 | Baltzer | 161/5 |
| 3,935,337 | 1/1976 | Taylor | 427/180 |
| 4,671,618 | 6/1987 | Wu | 350/347 V |
| 4,728,547 | 3/1988 | Vaz et al. | 428/1 |

FOREIGN PATENT DOCUMENTS

| | | |
|---|---|---|
| 0156615 | 10/1985 | European Pat. Off. . |
| 0205261 | 12/1986 | European Pat. Off. . |
| 0282963 | 9/1988 | European Pat. Off. . |
| 1908118 | 10/1969 | Fed. Rep. of Germany . |
| 1698092 | 7/1972 | Fed. Rep. of Germany . |
| 60-001273 | 1/1985 | Japan . |
| 60-001274 | 1/1985 | Japan . |
| 61-087748 | 5/1986 | Japan . |
| 85/04262 | 9/1985 | World Int. Prop. O. . |
| 87/01822 | 3/1987 | World Int. Prop. O. . |

*Primary Examiner*—Teddy S. Gron
*Assistant Examiner*—Richard Treanor
*Attorney, Agent, or Firm*—Wanda K. Denson-Low; Paul M. Coble

[57] ABSTRACT

A composite material having droplets of a liquid crystal material in a matrix of a copolymer of a multifunctional acrylate, or a mixture of different multifunctional acrylates, and a multifunctional mercaptan is prepared by photopolymerization. The liquid crystal material is initially mixed with a multifunctional acrylate monomer, a multifunctional mercaptan, and a photoinitiator to form a solution. The solution is exposed to ultraviolet light, whereupon the multifunctional acrylate monomer and multifunctional mercaptan copolymerize in a step reaction, and the liquid crystal separates from the copolymer as droplets dispersed throughout the copolymer matrix. The resulting material is placed between transparent, electrically conducting plates to form an electro-optic display device.

14 Claims, 1 Drawing Sheet

DISPERSION OF LIQUID CRYSTAL DROPLETS IN A PHOTOPOLYMERIZED MATRIX AND DEVICES MADE THEREFROM

BACKGROUND OF THE INVENTION

This invention relates to a material having liquid crystal droplets dispersed in a copolymer matrix, and, more particularly, to such a material prepared by photopolymerization.

Liquid crystals are materials which are liquids in the conventional sense of being a condensed state that is flowable. They contain long molecules of particular structures which exist in an oriented arrangement wherein many molecules are aligned with respect to each other. In a basic liquid crystal cell used in display devices, liquid crystals are placed between two sheets of a transparent conductor material, so that the liquid crystals are oriented in a selected manner. Upon application of an electric field, the liquid crystal molecules reorient in another manner. This reorientation is used to control the transmission of the cell to polarized light passed through the cell.

The basic liquid crystal cell just described is operable with many types of liquid crystal materials, but the design of the cell is cumbersome to use in some applications. The cell can be used to control polarized light, so that a polarizer is required. Since the liquid crystal remains a liquid within the cell, leakage of the liquid crystal material from the cell, or introduction of contaminants into the cell, can significantly interfere with the operation of the device. The preparation of curved or irregularly shaped displays, and the mass production of displays, is also difficult with this approach. Often, cost and weight considerations make this type of design inappropriate for particular applications.

Another approach to controlling the transmission of a cell to light is to divide the liquid crystal material into small droplets positioned between the transparent electrodes. If a liquid crystal is segregated into discrete droplets, the orientations of molecules within adjacent droplets are not correlated. However, the alignment of molecules in previously randomly oriented droplets can be achieved by an electric field applied to the transparent electrodes.

A different contrast mechanism operates when the liquid crystal molecules are provided in small droplets rather than in a continuous thin film between the electrodes, so that the cell can control light that is not previously polarized. When the molecules in the various droplets of a liquid crystal material are randomly oriented with respect to those in adjacent droplets, the liquid crystal scatters and does not transmit the light. Upon alignment of the molecules in the adjacent droplets, incident light is more readily transmitted through the bulk of the liquid crystal in the direction of the long axis of the liquid crystal molecules. This contrast mechanism depends upon scattering of light, not upon polarization effects, and is therefore useful with unpolarized light.

In one type of device, droplets or bubbles of the liquid crystal material are dispersed through the matrix of a transparent solid to form a composite material. The liquid crystal material and the transparent solid are selected to have matched indices of refraction. The liquid crystal material within the droplets is sealed against leakage and intrusion of contaminants. The droplets of liquid crystal are typically about 0.2 micrometer or greater in size and of irregular size and shape distribution, and often dispersed throughout the solid in a somewhat irregular distribution. Nevertheless, the solid matrix with the encapsulated droplets of liquid crystal experiences the same transition in optical transparency when an electrical field is applied, and can therefore be used in displays. Further, the use of plastic substrates that are coated with an optically transparent conductive layer and containing the composite material would allow for the preparation of large sheets which could be cut and shaped as needed.

Although such encapsulated liquid crystal materials are useful, their commercial use is inhibited by a lack of controllability in preparation and processing of the liquid crystal composite material. Processing usually requires heating of the encapsulated material, a step that is somewhat difficult to control. The droplets of liquid crystal material may be irregularly shaped and sized, and the liquid crystal material may vary from region to region in its response to an applied voltage.

There therefore exists a need for an improved technique for preparing liquid crystals encapsulated within a matrix to form composite materials for use in displays and other devices. The present invention fulfills this need, and further provides related advantages.

SUMMARY OF THE INVENTION

The liquid crystal material of the present invention provides the same benefits as previously prepared liquid crystal materials encapsulated as droplets within a polymer matrix. Additionally, the polymer can be cured with ultraviolet light without the need for heating, and can be tailored to exhibit a wide variety of physical and mechanical properties. The morphology of the droplets is regular and controllable, resulting in highly reproducible electro-optical properties of the material that are superior to prior materials of the type.

In accordance with the invention, a composite material comprises a plurality of droplets of a liquid crystal material within a matrix of a copolymer of a multifunctional acrylate and a multifunctional mercaptan, the liquid crystal having a solubility in the copolymer that is less than its solubility in a mixture of the unpolymerized constituents. In a related technique for preparing the composite material, a process for preparing a composite material comprises the steps of preparing a solution of a multifunctional acrylate monomer, a multifunctional mercaptan, a photoinitiator, and a liquid crystal material, the solubility of the liquid crystal material being greater in the solution than in a copolymer formed from the solution by photopolymerization; and exposing the solution to light to polymerize the multifunctional acrylate monomer and the multifunctional mercaptan to a copolymer by a step reaction, whereupon at least a portion of the liquid crystal material separates into a separate dispersed phase within a matrix of the copolymer. As used herein, the term "multifunctional acrylate" denotes a compound containing two or more acryloyl or methacryloyl functional groups and a "multifunctional acrylate monomer" includes either a single multifunctional acrylate or methacrylate or a mixture of several multifunctional acrylates or methacrylates. Mixtures are used to achieve particular physical or optical properties, such as a selected relation between the refractive indices of the polymer and the liquid crystal.

The liquid crystal material is initially mixed with the multifunctional acrylate and multifunctional mercaptan monomers, and the photoinitiator, forming a liquid solution of monomer and liquid crystal. The liquid crystal material is not, however, present in solution as a separated, discrete phase having a phase boundary with the monomer. In the solution, no droplets of the liquid crystal material are present. By contrast, if a mixture, rather than a solution, were present, then there would be separate, indentifiable droplets of the liquid crystal present throughout the processing.

Upon exposure to a sufficient intensity of ultraviolet light, the multifunctional acrylate monomer and the multifunctional mercaptan copolymerize by photopolymerization with a step reaction mechanism. The liquid crystal material is less soluble in the solid copolymer than in the liquid monomers. It separates to form a two-phase composite material of liquid crystal droplets within the copolymer matrix. The droplets of the liquid crystal material are regular in size and generally nearly spherical in shape, and are not extensively connected one to another. This separated morphology of the droplets is significant, as this structure results in highly reproducible properties for the material. In particular, when an electric field is applied and then removed from the composite material, the shut-off and return to the opaque state is rapid and reproducible, without a significant tail to the curve of transmission versus time after removal of the field.

The liquid crystal material is preferably present in an amount of from about 10 to about 60 percent of the total volume of the solution of liquid crystal material, photoinitiator, and monomer (before polymerization). The volume fraction of liquid crystal material is established by the amount mixed with the monomer and photoinitiator, prior to polymerization.

Any liquid crystal material having a positive dielectric anisotropy can be used, as long as it is soluble in the monomer chosen and is sufficiently less soluble in the polymer formed from the monomer to obtain phase separation into droplets. Cyanobiphenyl liquid crystals are preferred, but the invention is not so limited. For example, cyclohexylphenyls, pyrimidines, and cyanophenylbenzoates can also be used as the liquid crystal material.

The monomer with which the liquid crystal is mixed, and which is photopolymerized, is a mixture of a multifunctional acrylate (or mixture of multifunctional acrylates or methacrylates) and a multifunctional mercaptan. Acrylates photopolymerize rapidly but controllably in ultraviolet light. A wide variety of physical properties, such as refractive index, stability, durability, flexibility, and strength, can be tailored into the polymer matrix through the choice of particular acrylates or methacrylates. The choice of the refractive index of the polymer is particularly important, as the use of a polymer matrix having a refractive index equal to the ordinary refractive index of the liquid crystal material results in increased transmission when an electric field is applied. Scattering of light when no electric field is applied is a function of the difference between the refractive index of the polymer and the average refractive index of the liquid crystal, as well as the randomness of the orientation of the droplets.

Examples of acceptable multifunctional acrylate monomers are bis(1-acryloxy-2-hydroxypropyl)phthalate, bisphenol-A diacrylate, 1,3-butanediol diacrylate, 1,4-butanediol diacrylate, diethylene glycol diacrylate, dipentaerythritol monohydroxypentaacrylate, ethylene diacrylate, glycerol triethoxy triacrylate, glycerol propoxy triacrylate, 1,6-hexamethylene diacrylate, 3-methylpentanediol diacrylate, neopentyl glycol diacrylate, pentaerythritol tetraacrylate, pentaerythritol triacrylate, p-phenylene diacrylate, poly(ethylene glycol 400 diacrylate), 1,3-propanediol diacrylate, tetraethylene glycol diacrylate, thiodiethylene glycol diacrylate, triethylene glycol diacrylate, trimethylolpropanetriethoxytriacrylate, 1,1,1-trimethylolpropane triacrylate, tripropylene glycol diacrylate, tris(2-acryloxyethyl)isocyanurate, ethoxylated bisphenol-A diacrylate, and tris(acryloxy-2-hydroxypropyl)ether. Examples of acceptable multifunctional methacrylate monomers are bis(2-methacryloxyethyl)phosphate, bis(methacryloxy-2-hydroxypropyloxy)diethylene glycol, 1,3-butanediol dimethacrylate, 2,2-dimethylpropanediol dimethacrylate, diurethane dimethacrylate (also known as 7,7,9-trimethyl-3,13-dioxo-3,14-dioxa-5,12-diazahexadecane-1,16-diol dimethacrylate), 1,12-dodecanediol dimethacrylate, glycerol trimethacrylate, metacrylic anhydride, 1,5-pentanediol dimethacrylate, poly(ethylene glycol 200 dimethacrylate), poly(ethylene glycol 400 dimethacrylate), silicone (IV) tirmethacrylate, bisphenol-A diacrylate, and phenylenediacrylate.

The preferred multifunctional acrylate monomer are diurethane dimethacrylate, tripropyleneglycol diacrylate, and pentaerythritol tetra-acrylate.

The multifunctional mercaptan, also termed a thiol, is instrumental in altering the photpolymerization mechanism of the monomer mixture from a chain reaction to a step reaction. Examples of acceptable multifunctional mercaptan monomers are 2,2'-dimercaptodiethyl ether, glycol dimercaptoacetate, glycol dimercaptopropionate (also termed ethylene bis(3-mercaptopropionate)), pentaerylthritol tetra(3-mercaptopropionate, pentaerythritol tetrathioglycolate, trimethylolethane tri(3-mercaptopropionate), trimethylolethane trithioglycolate, trimethylolpropane tri(3-mercaptopropionate), trimethylolpropane trithioglycolate, dipentaerythritol hexa(3-mercaptopropionate), polyethylene glycol glycol dimercaptoacetate, and polyethylene glycol di(3-mercaptopropionate).

The preferred multifunctional mercaptan monomers are pentaerythritol tetramercaptopropionate, and trimethylolpropane tri-3-mercaptopropionate.

The photoinitiator can be any such compound appropriate for polymerizing the selected monomer. Examples of useful initiators for acrylates are 2,2-diethoxyacetophenone, 2,2-dimethoxyacetophenone, benzophenone, benzoyl peroxide, benzoin, benzil, and 2,2-disec-butoxyacetophenone, benzil dimethyl ketal (also termed 2,2-dimethoxy-2-phenylacetophenone, 2,2-dimethoxy-2-hydroxyacetophenone, 2,2-diethoxy-2-phenylacetonphenon, benzoin n-butyl ether, benzoin sec-butyl ether, benzoin ethyl ether, benzoin methyl ether, benzoin iso-propyl ether, 4-benzoyl-4'-methyldiphenyl disulfide, 1-hydroxycyclohexylphenyl ketone, and 2-hydroxy-2-methyl-1-phenylpropane-1-one.

The material of the invention is preferably used in electronic device that change from the opaque to the transparent state when an electric field is applied. In accordance with this aspect of the invention, a liquid crystal display device, comprises a pair of spaced transparent conductive substrates; and a composite material disposed between said substrates, said composite material comprising a plurality of droplets of a liquid crystal material within a matrix of a copolymer of a multifunctional acrylate and a multifunctional mercaptan, the liquid crystal having a solubility in the copolymer that is less than its solubility in a mixture of the unpolymerized constituents. Such devices have regular and reproducible performance characteristics, due to the properties of the composite liquid crystal material.

It will be appreciated that the liquid crystal material and devices provide an important advance in this art. Using appropriate substrates, the material can be prepared in large sheets suitable for cutting to required sizes and shapes, without applying heat. The resulting material can be tailored to a variety of physical properties. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
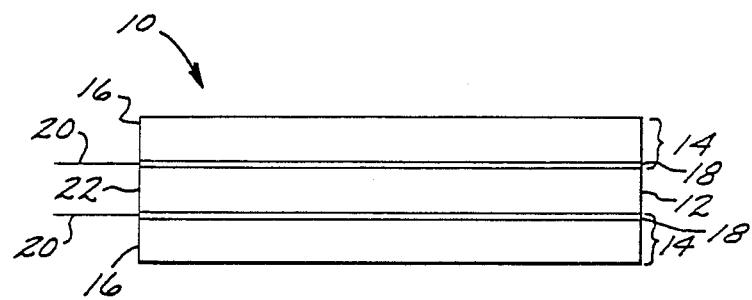
FIG. 1 is a side elevational view of a liquid crystal device utilizing the composite material of the invention.

FIG. 1 illustrates a liquid crystal display device 10. The device 10 includes an active element 12 sandwiched between two transparent electrodes 14. The transparent electrodes 14 can conveniently be glass pieces 16 that are coated on their inner surface with a thin coating 18 of an electrically conducting material such as indium tin oxide. External leads 20 are connected to each of the coatings 18 so that an electrical field can be applied between the electrodes 14, through the active element 12.

Figure 2:
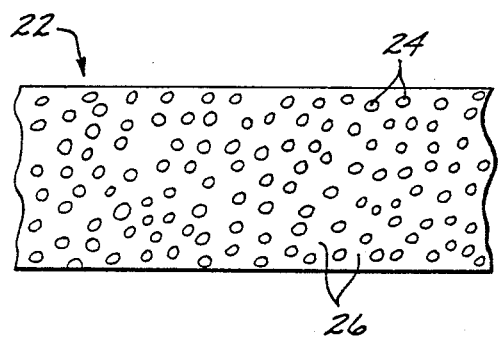
FIG. 2 is an enlarged sectional view of the composite material of the invention.

In accordance with the present invention, the active element 12 is a composite material. Such an active element 12 is shown in FIG. 2 as the composite material 22. The composite material 22 comprises a plurality of droplet 24, which can also be thought of as bubbles, of a liquid crystal material, within a matrix 26 of a polymer of a photopolymerizable monomer. The liquid crystal material is soluble in the monomer, and its solubility is less in the photopolymerized polymer than in the monomer. The volume fraction of the droplets 24 is the fraction of the volume of the entire composite material 22 that is occupied by the droplets 24. The volume fraction of the droplets 24 preferably ranges from about 0.10 (10 percent) to about 0.60 (60 percent). The size of the droplets is about ¼ to about 15 micrometers, although larger droplets are observed and are acceptable. Thickness of the composite material 22, in the direction between electrodes 14, can be selected as needed for specific applications, but is generally in the range of a few micrometers to over 100 micrometers.

When no or a low voltage is applied to the leads 20, the liquid crystal material within each droplet 24 exhibits some degree of alignment with the adjacent walls of the droplet due to the small size of the droplet. However, the liquid crystal material in the various droplets has no common alignment, and there is a generally random variation between the alignments of the liquid crystal molecules between different ones of the droplets 24. As a result, incident light directed through the composite material 22 is scattered, so that the device 10 is opaque. Depending upon the choice of the liquid crystal material, the matrix material, and the size and distribution of the droplets 24, the device 10 in this "off" state may be opaque white, opaque colored if a dye is present in the liquid crystal material, or translucent so that a small amount of diffused light is transmitted.

When a sufficiently large voltage is applied to the leads 20, the director of each liquid crystal molecule in each of the droplets 24 tends to align with the electric field between the electrodes 14. There is a strong tendency for a common alignment of the liquid crystal molecules within the various droplets 24. In this "on" state, the liquid crystal material no longer strongly scatters the incident light. The device 10 then becomes more transmissive and transparent, with a larger fraction of light being transmitted.

The composite material active element is prepared by first forming a solution of four components, the liquid crystal material, a multifunctional acrylate monomer and a multifunctional mercaptan that are subsequently copolymerized to a copolymer that forms the matrix, and a small amount of a photoinitiator that aids in photopolymerization of the monomers. The liquid crystal material is preferably a cyanobiphenyl, but may be any liquid crystal material that is soluble in the monomer and less soluble in the resulting polymer.

One of the monomers is a multifunctional acrylate (including methacrylate), herein defined as a molecule containing the acryloyl or methacryloyl groups in the monomer, $CH_2=CHCO-$ or $CH_2=C(CH_3)-CO-$, and having a functionality of at least 2, that is, having two or more polymerizable double bonds. In mixtures, a minor proportion of the mixture can have a functionality of less than 2, but on the average the functionality must be greater than 2 to achieve a crosslinked matrix.

Liquid monomers are preferred, as it is sometimes difficult to dissolve solid monomers even when using other liquid monomers. Even if solution is obtained with solid monomers, the solubility of the liquid crystal material is greatly reduced.

The other monomer is a multifunctional mercaptan, herein defined as a molecule containing the sulfhydryl group, —SH, and having a functionality of at least 2, that is, having two or more —SH groups. In mixtures, a minor proportion of the mixture can have a functionality of less than 2, but on the average the functionality must be greater than 2..

Various ratios of $—SH/C=C$ have been tried, ranging from 0.5 to 2 or more, all of which were operable. The preferred ratio of $—SH/C=C$ is in the range of 1.0 to 2.0, with a ratio of 1.5 to 1.9 most preferred.

Other additions may be made to the material, such as multifunctional allyl monomers, which copolymerize with the polyfunctional mercaptan compounds. These additions can be made to adjust the refractive index of the polymer to match that of the ordinary refractive index of the liquid crystal, to promote the dissolution of the liquid crystal in the monomer mixture, or to promote phase separation during polymerization.

The solution of the four components is stirred until full solution is attained. The solution is then applied to a form that defines its shape upon copolymerization. The solution is typically a slightly viscous liquid, so that application to the form is not difficult. The form might be a dish with sides, the space between the electrodes, or otherwise as appropriate.

Polymerization is achieved by directing a light of appropriate wavelength and intensity toward the solution. Ultraviolet light is typically used. A mercury lamp which emits light in the 300 to 500 nanometer wavelength range, with the greatest intensity at about 365 nanometers, is preferred. With the assistance of the light energy and the photoinitiator, the monomers copolymerize in a time ranging from a few seconds to a few minutes.

As the photopolymerization proceeds, the liquid crystal material in solution becomes progressively less soluble in the polymerizing matrix material. Eventually, the solubility limit of the liquid crystal material in the polymerizing matrix is exceeded sufficiently that droplets 24 of the liquid crystal material are formed in the matrix 26 of the polymer. The droplets are fairly uniform in size, and are dispersed throughout the polymerized matrix in a generally uniform manner. This manner of formation of the droplets of the liquid crystal material has significant advantages over prior methods where the droplets were formed largely by mechanical means. Formation from solution ensures a uniform spatial distribution of the droplets and a uniform size, while mechanically formed droplets tend to have a more nonuniform distribution and a greater range of sizes. The present approach also permits easier preparation of the composite material, as the mixing need only extend to achieving full solution, not to achieving a uniform array of droplets by mechanical means.

The step mechanism of copolymerization is important in attaining a uniform microstructure of liquid crystal droplets uniformly dispersed in the copolymer matrix. In a chain reaction, the monomer concentration decreases steadily throughout the reaction, while in a step reaction the monomer disappears early in the reaction, while the degree of polymerization is low. Also, in a chain reaction, highly polymerized molecules appear almost immediately, while in a step reaction the highly polymerized species does not appear until relatively late in the reaction.

The result is that, in the step reaction process, the droplets of the liquid crystal form before there is a crosslinking of polymer regions that would prevent the formation of regular droplets in the interstitial volumes. Alternatively stated, when the matrix polymerizes by the step reaction mechanism, the liquid crystal droplets are likely to form before the highly polymerized matrix develops. When the matrix polymerizes by the chain reaction mechanism, highly polymerized molecules are likely to form first and polymer particles precipitate, with the drops of the liquid crystal forming in the remaining irregular interstices. The use of the multifunctional acrylate monomer and the multifunctional mercaptan together cause the copolymer to form by the step mechanism that favors the desirable microstructure.

The following examples are presented to illustrate aspects of the invention, and should not be taken as limiting of the invention in any respect.

EXAMPLE 1

A monomer mixture was formed from 100 parts (by volume) of diurethane dimethacrylate, 100 parts of tripropylene glycol diacrylate, 250 parts of pentaerythritol tetramercaptopropionate, and 65 parts of 2,2-diethoxyacetophenone. To this mixture was added 515 parts of the commercial liquid crystal material BDH E-9, which has a formulation of 15 weight percent of 4-cyano-4'-propyloxybiphenyl, 38 weight percent of 4-cyano-4'-pentyloxybiphenyl, 38 weight percent of 4-cyano-4'-heptyloxybiphenyl, and 9 weight percent of 4-cyano-4'pentyl-p-terphenyl. After mixing for about 1 minute, the result was a solution having no separate phase.

The solution, having a viscosity slightly greater than water, was placed between two conductive glass plates that serve as electrodes. The glass plates were previously coated on the inner sides (facing the solution) with a thin, electrically conductive coating of indium tin oxide. The spacing between the glass plates, which defines the thickness of the active element, was about 12 micrometers, and was established by using a premeasured Mylar spacer. The glass slides, with the solution therebetween, was placed under an ultraviolet light source. The source was a 350 watt, high pressure mercury lamp, enclosed in a lamp housing. The source emitted light in the 300 to 500 nanometer wavelength range, with the most intense light emitted at 365 nanometers. The total light intensity of the source was about 60 milliwatts per square centimeter at the sample surface. Flood exposure of the cell lasted for three minutes, leading to polymerization of the monomer mixture. All of the mixing and processing was at ambient temperature.

The resulting cell was white in color and opaque.

EXAMPLE 2

The cell prepared in Example 1 was tested by measuring the transmission of green light through the cell in the absence of an applied voltage, and when a voltage of 100 volts (RMS at 100 Hz) was applied. The transmission in the absence of an applied voltage and field was about 1 percent. When 25 volts was applied, the transmission was at least about 90 percent. The electro-optic properties were reproducible. That is, the low transmission of about 1 percent returned immediately after the applied field was discontinued, and the same degree of transmission was obtained when the voltage was applied again.

EXAMPLE 3

The composition of Example 1 was cast upon an aluminum base, and photopolymerized as in Example 1. A piece of the resulting material was examined in a scanning electron microscope. The sample had a "Swiss cheese" morphology, with droplets of liquid crystal material dispersed throughout the polymerized matrix.

EXAMPLE 4

Example 1 was repeated, except that the solution was formulated as 1 part (by volume) of diurethane dimethacrylate, 1 part of tripropylene glycol diacrylate, 0.02 parts of 2,2-diethoxyacetophenone, and 2 parts of the commercial liquid crystal BDH E-9. This formulation is not within the scope of the invention, lacking the multifunctional mercaptan. The cell as prepared was white and opaque.

EXAMPLE 5

Example 2 was repeated, except using the composite material prepared by Example 4. The cell had a transmission of about 10 percent when no voltage was applied, and a transmission of about 55 percent when a voltage of 100 volts was applied. The electro-optic properties were not reproducible, showing a long time delay for the opaque condition to return when the applied electric field was discontinued.

EXAMPLE 6

Example 3 was repeated, except that the composite material was that of Example 4. The morphology of the material was shown to be the "polymer ball" morphology wherein the copolymer phase is found in large blocks with the liquid crystal material irregularly dispersed through the interstices.

EXAMPLE 7

A solution was prepared containing 0.58 grams of tris(2-acryloxyethyl)isocyanurate and 1.30 grams of triallyl isocyanurate. Two parts by volume of this solution was mixed with one part of a solution of pentaerythritol tetra-3-mercaptopropionate having sufficient benzophenone to yield 2 percent by weight of the total solution. Two parts of the resulting solution was mixed with 1 part of 2-hydroxypropyl acrylate. This solution had a refractive index of 1.500. One part of this solution was mixed with one part of RO-TN-570 commercial liquid crystal material, which has an ordinary refractive index of 1.52, to form a solution. The RO-TN-570 is a cyanobiphenyl liquid crystal mixture available from Hoffmann-LaRoche. The composition of the RO-TN-570 mixture is 51 weight percent of 4-cyano-4'-pentylbiphenyl, 25 weight percent of 4-cyano-4'-heptylbiphenyl, 16 weight percent of 4-cyano-4'-octyloxybiphenyl, and 8 weight percent of 4-cyano-4'-pentyl-p-terphenyl.

The solution was placed between conductive glass plates as described in Example 1, and exposed to ultraviolet light as described in Example 1, except that the time of exposure was 2 minutes. The resulting composite material had a dispersion of droplets of liquid crystal dispersed uniformly within the copolymer matrix. The material was opaque and white in color. When a 100 volt (100 Hz) electric field was applied to the conductive plates, the transmission of the device became 95 percent. This excellent transmissivity was due to the match between the refractive indices of the copolymer matrix and the oriented liquid crystal.

The method of the present invention thus provides an improved liquid crystal-containing composite material that can be cut and shaped, and does not suffer degradation of the liquid crystal by leakage of contaminants. The resulting material can be readily tailored to achieve particular structural and optical characteristics, as needed. Polymerization is accomplished by photopolymerization, so that mechanical stirring that might produce bubbles and heating are not required. Although particular embodiments of the invention have been described in detail for purposes of illustration, various modifications may be made without departing from the spirit and scope of the invention. Accordingly, the invention is not to be limited except as by the appended claims.

What is claimed is:

1. A composite material, comprising a plurality of droplets of a liquid crystal material within a matrix of a copolymer of a multifunctional acrylate and a multifunctional mercaptan, the liquid crystal having a solubility in the copolymer that is less than its solubility in a mixture of the unpolymerized constituents.

2. The composite material of claim 1, wherein the liquid crystal material is a cyanobiphenyl-containing mixture.

3. The composite material of claim 1, wherein the multifunctional acrylate is a mixture of multifunctional acrylates.

4. The composite material of claim 1, wherein the multifunctional acrylate is a multifunctional methacrylate.

5. The composite material of claim 1, wherein the multifunctional acrylate is an acrylate selected from the group consisting of bis(1-acryloxy-2-hydroxypropyl)phthalate, bisphenol-A diacrylate, 1,3-butanediol diacrylate, 1,4-butanediol diacrylate, diethylene glycol diacrylate, dipentaerthritol monohydroxypentaacrylate, ethylene diacrylate, glycerol triethoxy triacrylate, glycerol propoxy triacrylrate, 1,6-hexamethylene diacrylate, 3-methylpentanediol diacrylate, neopentyl glycol diacrylate, pentaerythritol tetraacrylate, pentaerythritol triacrylate, p-phenylene diacrylate, poly(ethylene glycol 400 diacrylate), 1,3-propanediol diacrylate, tetraethylene glycol diacrylate, thiodiethylene glycol diacrylate, triethylene glycol diacrylate, trimethylolpropanetriethoxytriacrylate, 1,1,1-trimethylolpropane triacrylate, tripropylene glycol diacrylate, tris(2-acryloxyethyl)isocyanurate, ethoxylated bisphenol-A diacrylate, tris(acryloxy-2-hydroxypropyl)ether, and mixtures thereof.

6. The composite material of claim 1, wherein the multifunctional acrylate monomer is a methacrylate selected from the group consisting of bis(2-methacryloxyethyl)phosphate, bis(methacryloxy-2-hydroxypropyloxy)diethylene glycol, 1,3-butanediol dimethacrylate, 2,2-dimethylpropanediol diemthacrylate, diurethane dimethacrylate, 1,1,2-dodecanediol dimethacrylate, glycerol trimethacrylate, methacrylic anhydride, 1,5-pentanediol dimethacrylate, poly(ethylene glycol 200 dimethacrylate), poly(ethylene glycol 400 dimethacrylate), silicone (IV) trimethacrylate, bisphenol-A diacrylate, phenylenediacrylate, and mixtures thereof.

7. The composite material of claim 1, wherein the multifunctional acrylate monomer is an acrylate selected from the group consisting of diurethane dimethacrylate, tripropyleneglycol diacrylate, pentaerythritol tetra-acrylate, and mixtures thereof.

8. The composite material of claim 1, wherein the multifunctional mercaptan is selected from the group consisting of 2,2'-dimercaptodiethyl ether, glycol dimercaptoacetate, glycol dimercaptopropionate (also termed ethylene bis(3-mercaptopropionate)), pentaerythritol tetra(3-mercaptopropionate), pentaerythritol tetrathioglycolate, trimethylolethane tri(3-mercaptopropionate), trimethylolethane trithioglycolate, trimethylolpropane tri(3-mercaptopropionate), trimethylolpropane trithioglycolate, dipentaerythritol hexa(3-mercaptopropionate), polyethylene glycol glycol dimercaptoacetate, polyethylene glycol di(3-mercaptopropionate), and mixtures thereof.

9. The composite material of claim 1, wherein the multifunctional mercaptan is selected from the group consisting of pentaerythritol tetramercaptopropionate, trimethylolpropane tri-3-mercaptopropionate, and mixtures thereof.

10. The composite material of claim 1, wherein the ratio of —SH groups in the multifunctional mercaptan to the carbon double bonds in the multifunctional acrylate is from about 0.5 to about 2.0.

11. The composite material of claim 1, wherein the ratio of —SH groups in the multifunctional mercaptan to the carbon double bonds in the multifunctional acrylate is from about 1.5 to 1.9.

12. A liquid crystal display device, comprising:
a pair of spaced transparent conductive substrates; and a composite material disposed between said substrates, said composite material comprising a plurality of droplets of a liquid crystal material within a matrix of a copolymer of a multifunctional acrylate, having at least two functional groups selected from the group consisting of acryloyl and methacryloyl, and a multifunctional mercaptan, having at least two thiol groups, the solubility of the liquid crystal material being greater in a solution of the multifunctional acrylate and the multifunctional mercaptan than in the copolymer formed from the solution by photopolymerization.

13. The display device of claim 12, wherein the liquid crystal material is a cyanobiphenyl-containing mixture.

14. The display device of claim 12, wherein the multifunctional acrylate is a mixture of multifunctional acrylates.

* * * * *